(12) United States Patent
Wang et al.

(10) Patent No.: US 9,253,415 B2
(45) Date of Patent: Feb. 2, 2016

(54) SIMULATING TRACKING SHOTS FROM IMAGE SEQUENCES

(71) Applicant: Adobe Systems Incorporated, San Jose, CA (US)

(72) Inventors: Jue Wang, Kenmore, WA (US); Sunghyun Cho, Seattle, WA (US); Shuaicheng Liu, Singapore (SG)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 115 days.

(21) Appl. No.: 14/091,658

(22) Filed: Nov. 27, 2013

(65) Prior Publication Data

US 2015/0147047 A1  May 28, 2015

(51) Int. Cl.
*G06K 9/40* (2006.01)
*H04N 5/262* (2006.01)
*G11B 27/02* (2006.01)
*G06T 5/00* (2006.01)
*G06T 5/50* (2006.01)

(52) U.S. Cl.
CPC .............. *H04N 5/2621* (2013.01); *G06T 5/003* (2013.01); *G06T 5/50* (2013.01); *G11B 27/02* (2013.01); *G06T 2207/10016* (2013.01)

(58) Field of Classification Search
CPC ...... H04N 5/2621; G11B 27/02; G06T 5/003; G06T 5/50; G06T 2207/10016
USPC .......................... 382/255, 274–275; 386/280
See application file for complete search history.

(56) References Cited

U.S. PATENT DOCUMENTS

| 7,702,131 | B2 * | 4/2010 | Chinen et al. | 382/103 |
|---|---|---|---|---|
| 2004/0062450 | A1 * | 4/2004 | Kondo et al. | 382/266 |
| 2008/0316328 | A1 * | 12/2008 | Steinberg et al. | 348/222.1 |
| 2009/0003652 | A1 * | 1/2009 | Steinberg et al. | 382/103 |

OTHER PUBLICATIONS

Agarwala, A., et al., "Interactive digital photomontage", ACM Transactions on Graphics (TOG)—Proceedings of ACM SIGGRAPH 2004, 23(3), (Aug. 2004), pp. 294-302.
Brostow, Gabriel J, et al., "Image-based motion blur for stop motion animation", SIGGRAPH '01 Proceedings of the 28th Annual Conference on Computer Graphics and Interactive Techniques, (2011), pp. 561-566.
Brox, Thomas, et al., "Object Segmentation by Long Term Analysis of Point Trajectories", Computer Vision—ECCV 2010, Lecture Notes in Computer Science, vol. 6315, (2010), pp. 282-295.
(Continued)

*Primary Examiner* — Kanjibhai Patel
(74) *Attorney, Agent, or Firm* — Shook, Hardy & Bacon L.L.P (57) ABSTRACT

A simulated tracking shot is generated from an image sequence in which a foreground feature moves relative to a background during capturing of the image sequence. The background is artificially blurred in the simulated tracking shot in a spatially-invariant manner corresponding to foreground motion relative to the background during a time span of the image sequence. The foreground feature can be substantially unblurred relative to a reference image selected from the image sequence. A system to generate the simulated tracking shot can be configured to derive spatially invariant blur kernels for a background portion by reconstructing or estimating a 3-D space of the captured scene, placing virtual cameras along a foreground trajectory in the 3-D space, and projecting 3-D background points on to the virtual cameras.

20 Claims, 9 Drawing Sheets

(56) References Cited

OTHER PUBLICATIONS

Dai, Yuchao, et al., "A simple prior-free method for non-rigid structure-from-motion factorization", 2012 IEEE Conference on Computer Vision and Pattern Recognition (CVPR), (2012), pp. 2018-2025.

Dragon, R., et al., "Multi-scale Clustering of Frame-to-Frame Correspondences for Motion Segmentation", Computer Vision—ECCV 2012 Lecture Notes in Computer Science 2012, (2012), pp. 445-458.

Felzenszwalb, Pedro F., et al., "Efficient Graph-Based Image Segmentation", International Journal of Computer Vision, 59(2), (2004), pp. 167-181.

Hartley, Richard, et al., "Chapter 1; Projective Geometry and Transformations of 2D", Multiple view geometry in computer vision, Cambridge, UK ; New York : Cambridge University Press, (2000), pp. 1-44.

Kumar, M. P, et al., "Learning Layered Motion Segmentations of Video", International Journal of Computer Vision, 76(3), (2007), pp. 301-319.

Liu, Feng, et al., "Content-preserving warps for 3D video stabilization", ACM Transactions on Graphics (TOG)—Proceedings of ACM SIGGRAPH 2009, 28(3), (2009), pp. 1-10.

Liu, Feng, et al., "Subspace video stabilization", ACM Transactions on Graphics, 30(1), (Jan. 2011), pp. 1-10.

Liu, S., et al., "Bundled camera paths for video stabilization", ACM Transactions on Graphics (TOG)—SIGGRAPH 2013 Conference Proceedings, 32(4), (Jul. 2013), pp. 1-10.

Matsushita, Y., et al., "Full-frame video stabilization", IEEE Computer Society Conference on Computer Vision and Pattern Recognition, 2005. CVPR 2005, vol. 1, (2005), pp. 50-57.

Ochs, P., et al., "Higher order motion models and spectral clustering", 2012 IEEE Conference on Computer Vision and Pattern Recognition (CVPR), (2012), pp. 614-621.

Park, H. S, et al., "3D Reconstruction of a Moving Point from a Series of 2D Projections", Image Processing, Computer Vision, Pattern Recognition, and Graphics 2010, Computer Vision—ECCV 2010, (2010), pp. 158-171.

Pollefeys, M., et al., "Visual Modeling with a Hand-Held Camera", International Journal of Computer Vision, 59(3), (Sep. 2004), pp. 207-232.

Seitz, S. M, et al., "A Comparison and Evaluation of Multi-View Stereo Reconstruction Algorithms", 2006 IEEE Computer Society Conference on Computer Vision and Pattern Recognition, vol. 1, (2006), pp. 519-528.

Sunkavalli, K., et al., "Video Snapshots: Creating High-Quality Images from Video Clips", IEEE Transactions on Visualization and Computer Graphics, 18(11), (Nov. 2012), pp. 1868-1879.

Yan, Jingyu, et al., "A General Framework for Motion Segmentation: Independent, Articulated, Rigid, Non-rigid, Degenerate and Non-degenerate", Computer Vision—ECCV 2006 Lecture Notes in Computer Science, vol. 3954, 2006, pp. 94-106.

Zhang, G. F, "Motion imitation with a handheld camera", IEEE Trans Vis Comput Graph., 17(10), (Oct. 2011), pp. 1475-1486.

* cited by examiner

SIMULATING TRACKING SHOTS FROM IMAGE SEQUENCES

TECHNICAL FIELD

The subject matter disclosed herein generally relates to image processing and editing. More particularly, the subject matter relates to methods and systems for automated generation of a simulated still image from an image sequence, such as a video clip.

BACKGROUND

Tracking is a photographic technique often used to take a photograph or picture of a moving subject such that a sense of the subject's motion is captured. Tracking shots can be achieved by moving the camera and keeping the subject in more or less the same position of the frame for the duration of the exposure. When executed correctly, this technique results in a photograph when the moving foreground is relatively sharp, while the background is blurred consistent with the camera's motion during exposure.

Satisfactory tracking shots, however, can be difficult to capture, particularly for novices and less experienced photographers. The challenges inherent in capturing a good tracking shots are amplified in cases where the motion of the subject is complex, such as where the subject follows a nonlinear path.

BRIEF DESCRIPTION OF THE DRAWINGS

Example embodiments of the disclosure are illustrated by way of example, and not by way of limitation, in the figures of the accompanying drawings.

DETAILED DESCRIPTION

In the following description, for purposes of explanation, numerous specific details are set forth to provide a thorough understanding of example embodiments. It will be evident to one skilled in the art, however, that the present subject matter may be practiced without these specific details.

Overview

One aspect of the disclosure provides a method comprising generating a simulated tracking shot based on an image sequence. The image sequence may form part of a video clip, having been captured by a video camera. In other embodiments, the image sequence may comprise a series of still images (e.g., digital photographs or pictures) captured by a camera.

A "tracking shot" means a still image having motion-blurred background features and a foreground feature which is substantially without motion-blurring, the motion-blurring of the background features corresponding to camera movement or foreground movement relative to the respective background features. A video clip of a subject scene comprising the foreground feature moving relative to the background may thus be processed to produce a tracking shot that simulates tracking movement of the foreground feature relative to the background with an exposure time corresponding to several frames of the video clip.

In an example embodiment, a photo editing application (e.g., Adobe® Photoshop®, LightRoom® or the like) may derive spatially variant blur parameters for at least part of a background portion of a reference image selected from the image sequence. The simulated tracking shot may then be generated by modifying the reference image by blurring the background portion of the reference image based on the derived spatially varying blur parameters. The spatially invariant blurring of the background portion thus reflects relative movement of the background during a time span of the image sequence (corresponding to an exposure time of the simulated tracking shot), with the foreground portion of the simulated tracking shot being substantially unblurred relative to the foreground portion of the reference image.

In some embodiments, the selecting of the reference image may comprise user selection of the reference image. The system may thus be configured to prompt a user to select the reference image, for example including displaying respective images in the image sequence. In other embodiments, the reference image may be selected automatically, e.g., by an image in the middle of the time span.

"Spatially varying" parameters, values, or variables means that the relevant parameters, values, or variables are not uniform for an entire image, but may vary between different positions in a two-dimensional image. The spatially variant blur parameters may comprise spatially varying blur kernels (e.g., per-pixel blur kernels for at least the background portion) for the reference image. As is well-established, a kernel is a matrix which is small relative to a target image, and which can be used in image processing for blurring, sharpening, embossing, edge detection, and the like, by means of convolution between the kernel and the target image. A "blur kernel" means a kernel which is configured for blurring the target image. In this instance, the blur kernels may be configured for applying motion blurring to the background portion, with different parts of the background portion being blurred differently, based on their respective motions relative to the image foreground during the image sequence.

In such case, generation of the modified image may comprise convolving the reference image and the per-pixel blur kernels. The method may comprise associating dotted blur kernels with respective image pixels in the foreground feature. A "dotted blur kernel" means a blur kernel that applies no blurring to the corresponding image portion.

The method may comprise reconstructing a three-dimensional space of the subject scene, and may include determining a foreground trajectory that reflects movement of the foreground feature in the reconstructed three-dimensional space. The reconstructed three-dimensional space of the subject scene may include multiple three-dimensional background points corresponding to the background portion of the reference image. In one embodiment, reconstruction of the three-dimensional space comprises automated Structure-from-Motion (SFM) analysis. In another embodiment, reconstruction of the three-dimensional space may comprise estimating relative depths for the multiple background points based on analysis of feature tracks that track movement of multiple background features over the time span of the image sequence.

Derivation of the blur kernels may comprise positioning a plurality of virtual cameras at respective three-dimensional positions in the reconstructed three-dimensional space, and projecting the multiple background points on to the plurality of virtual cameras. Each background point thus produces a two-dimensional projection point on each of the plurality of virtual cameras, and thereby providing a set of two-dimensional projection points. The set of two-dimensional projection points for each background point may be combined or collated to produce a corresponding blur kernel, or to produce blur parameters from which a corresponding blur kernel may be derived.

The plurality of virtual cameras may be placed at time-indexed positions along the foreground trajectory. In another embodiment, positions for the virtual cameras along the foreground trajectory may be determined by equally sampling several positions on the foreground trajectory around a time instance corresponding to the reference image. In one embodiment, the plurality of virtual cameras have a common, fixed rotation in the three-dimensional space and are centered on the foreground trajectory. In such case, the foreground feature is located centrally in the two-dimensional image plane of each virtual camera.

More particular features of example embodiments of the disclosed method and system will now be described.

Example Embodiment

As described herein, in some example embodiments, systems and methods are described that are configured to process image sequences and/or create modified or simulated images via an image or photo editing application, such as the Adobe® Photoshop® family of applications. The technology may be implemented by one or more applications resident on a computing device (e.g., mobile computing device) and/or in a networked environment (e.g., a cloud-based network environment) where processing may, or may not, be distributed.

Figure 1:
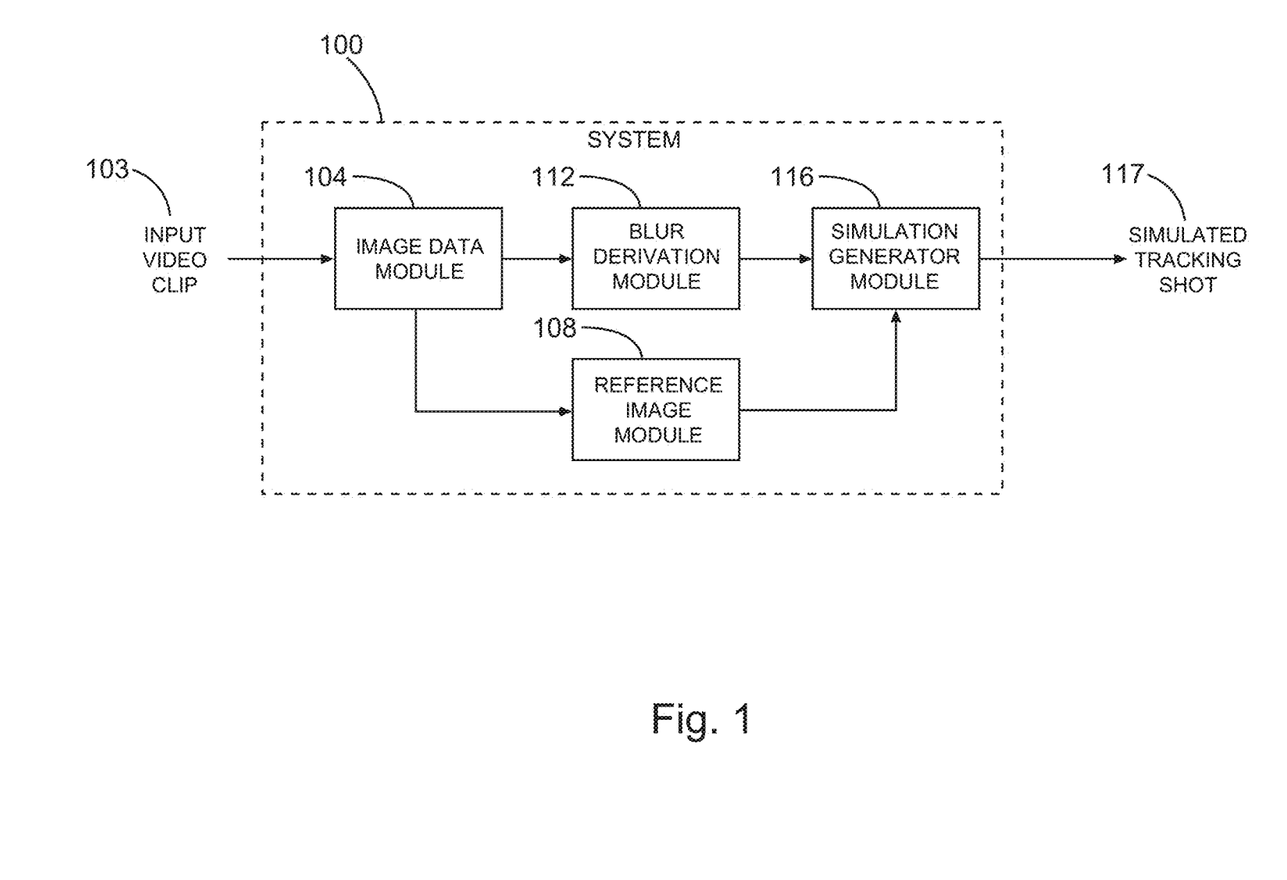
FIG. 1 is a schematic diagram of a system for generating a simulated tracking shot, in accordance with an example embodiment.

FIG. 1 is a block diagram illustrating a system 100, in accordance with an example embodiment, for simulating a tracking shot based on an image sequence. The system 100 may be implemented on any number of different hardware components. In an example embodiment, the system 100 is implemented on a computer system having one or more processors to execute respective operations of the method. In another example embodiment, the system 100 may be executed using a graphics processing unit (GPU).

In some embodiments, the system 100 may reside on a user machine, such as a personal computer (PC), tablet computer, smartphone, and the like. In other embodiments, the system 100 may reside on a centralized server in communication with a user machine. In such embodiments, the user machine may direct the centralized server to perform one or more operations of a process for generating a simulated tracking shot, for example to reconstruct a three-dimensional space of a subject scene and to derive spatially varying blur kernels for a background portion. It should be noted that hybrid embodiments are also envisioned, where some aspects of the generation of a simulated tracking shot are performed on a centralized server. This allows a user machine to offload part or all of the image analysis and/or simulated image generation to another machine for faster processing.

The system 100 may include an image data module 104 to receive and access image data for an image sequence of a subject scene. In this example, the image data comprises an input video clip 103 selected by a user through operation of the image data module 104. The system 100 also comprises a reference image module 108 for selecting a reference image from the inputted image sequence. In this example, the reference image is selected by the user, and is provided by a particular selected frame of the input video clip 103.

A blur derivation module 112 is configured to process the image data to derive spatially variant blur parameters (e.g., spatially varying blur kernels) for at least parts of the background portion of the reference image. The spatially variant blur parameters are representative of motion of respective parts of the background of the subject scene captured in the video clip 103 relative to a foreground portion or tracking subject of the video clip 103. The system 100 further includes a simulation generator module 116 to generate a modified image, relative to the reference image, that represents a simulated tracking shot 117 based on the input video clip 103. The background portion of the simulated tracking shot 117 is thus blurred to simulate the relative movement of the background during a time span of the image sequence (or, in some cases, a smaller time span within the image sequence), while a foreground portion of the simulated tracking shot 117 is substantially unblurred relative to the reference image.

Figure 2:
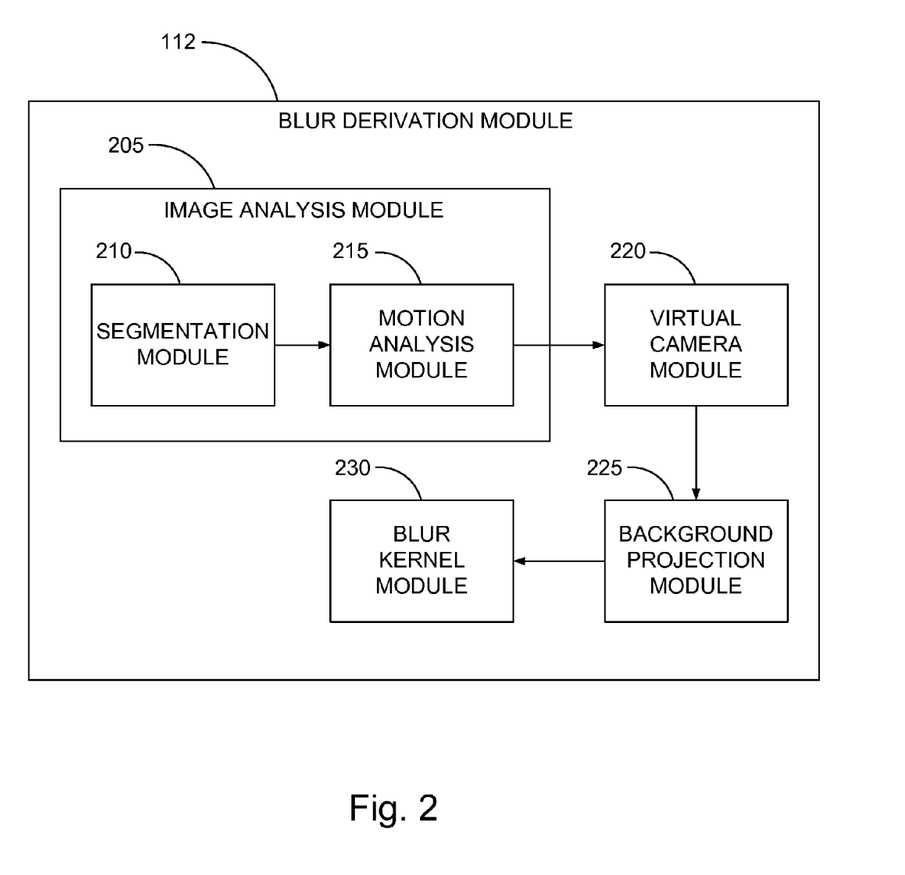
FIG. 2 is a schematic diagram of a blur derivation module which may form part of the system of FIG. 1, in accordance with one example embodiment, the blur derivation module being configured to derive blur parameters for tracking shot simulation from an input image sequence.

FIG. 2 is a block diagram showing an example embodiment of the blur derivation module 112. The blur derivation module 112 includes an image analysis module 205 to process the image data provided by the input video clip 103 to enable reconstruction or estimation of a three-dimensional space within which the subject scene is set. The image analysis module 205 may thus be configured to provide as output a reconstructed 3-D space for the subject scene of the input video clip 103. Such a reconstructed 3-D space may comprise 3-D coordinates for at least some background features forming part of the background portion.

The image analysis module 205 may further include a segmentation module 210 for processing the image data to automatically identify the foreground portion of the reference image, and to segment the foreground portion and the background portion. A motion analysis module 215 may further be provided for determining from the image data a foreground trajectory that reflects movement of features forming part of the foreground portion relative to the background. The foreground trajectory may be a three-dimensional trajectory in the reconstructed 3-D space.

The blur derivation module 112 may further include a virtual camera module 220 to position a plurality of virtual cameras at respective positions in the three-dimensional space of the subject scene. In this example embodiment, the virtual camera module 220 is configured to position the plurality of virtual cameras along the foreground trajectory. A background projection module 225 is provided to project multiple background points in the reconstructed three-dimensional space on to the plurality of virtual cameras, to provide a two-dimensional projection point on each of the plurality of virtual cameras for each of the multiple background points. The blur derivation module 112 may further include a blur kernel module 230 that is configured to derive a separate blur kernel for each of the multiple background points based on a corresponding set of two-dimensional projection points on the plurality of virtual cameras.

Figure 3:
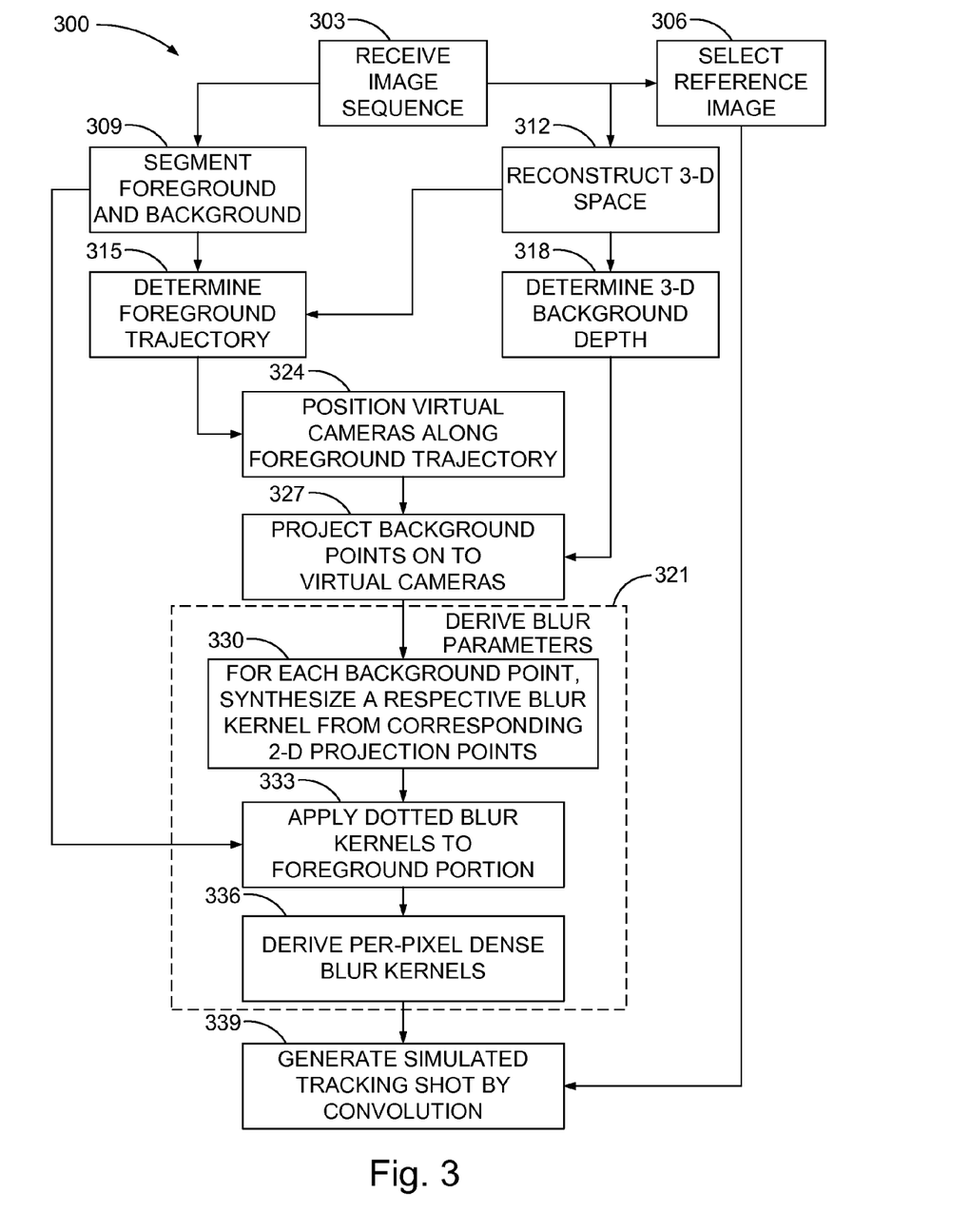
FIG. 3 is a flowchart showing an example embodiment of a method for generating a simulated tracking shot based on an image sequence, in accordance with an example embodiment.

Further details of examples operation of the respective modules briefly described above will become evident from the following description of an example embodiment of a method of generating a simulated tracking shots from an image sequence, as illustrated schematically by the flow diagram in FIG. 3. The method 300 may be performed by use of the example system 100.

At operation 303, digital image data comprising an input image sequence is received from a user. As mentioned, the input image sequence is, in this example embodiment, an input video clip 103. In other embodiments, a sequence of input images can comprise a series of still images, such as a series of digital photographs captured with a photo camera. A common feature of more sophisticated digital cameras is the functionality of capturing a series of closely spaced digital pictures, often referred to the so-called burst mode, in which the camera continues capturing different digital pictures for as long as a camera trigger is depressed by the user. The digital pictures in such image sequences are typically taken at relatively high shutter speeds, so that a background of the respective still images is captured in sharp focus. This typically fails to convey to a viewer in a sense of motion of the foreground feature relative to the background. It is a benefit of the described functionality of generating a simulated tracking shot based on such sharply focused action images, that it enables the provision of a tracking shot in which the foreground is in relatively sharp focus, while motion of the foreground or subject of the simulated tracking shot is indicated by accurately simulated blurring of the background.

Figure 4A:
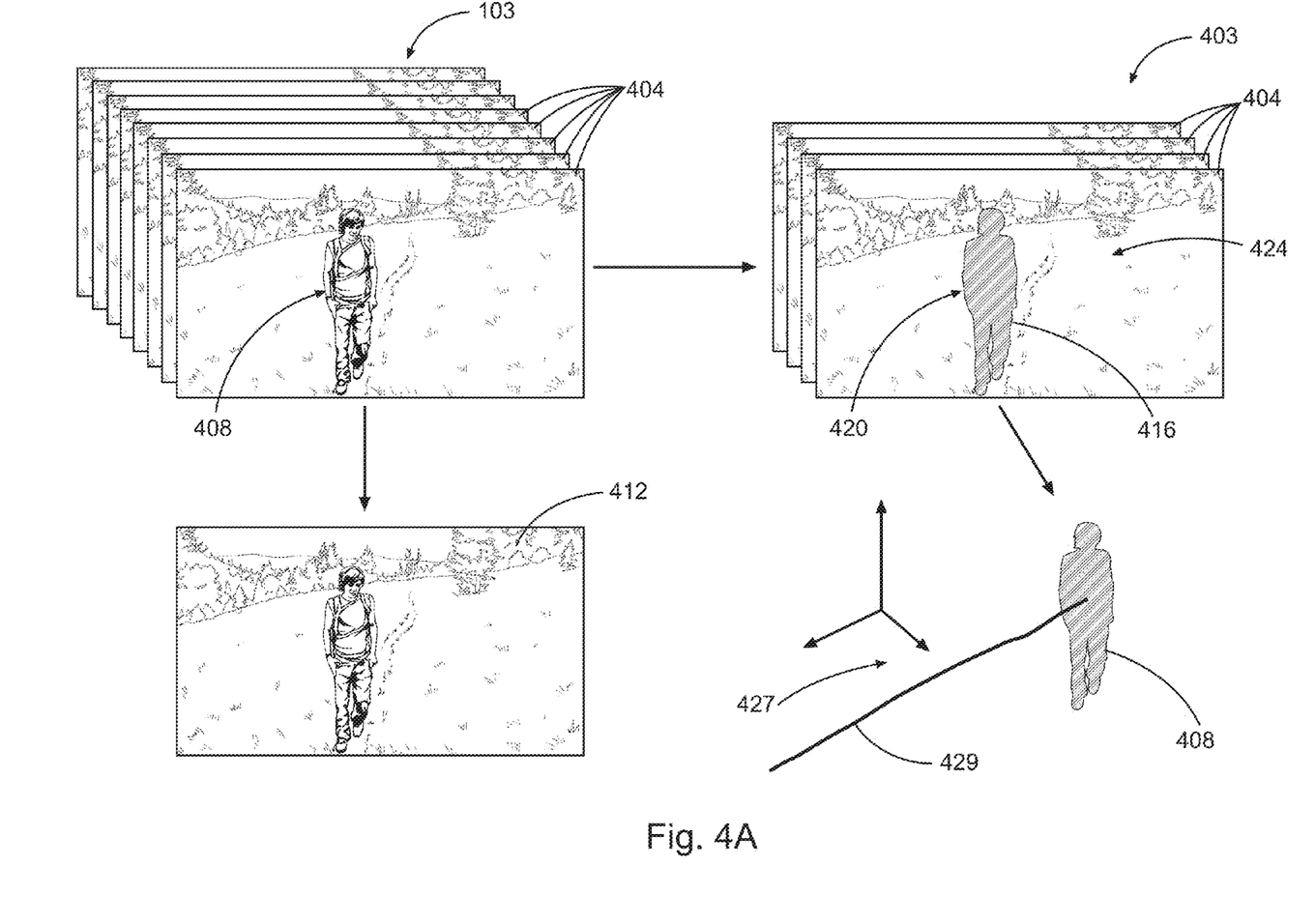
FIG. 4A is a schematic diagram showing example image processing outputs during processing of an example image sequence in accordance with the example method of FIG. 3.

FIG. 4A shows a schematic representation of the example input video clip 103, consisting of a sequence of digital images captured at different, sequential times in respective frames 404 of the video clip 103. The video clip frames 404 are of a common subject scene, in this example embodiment capturing movement of a hiker 408 through an outdoor landscape. Because the hiker 408 is the subject of tracking focus in the video clip 103, the hiker 408 in this example embodiment provides a foreground of the subject scene, while features of the outdoor landscape form part of the background of the subject scene. Note that the distinction between background and foreground features is not based strictly on real-world three-dimensional depth of the respective parts of the scene, but part of at least some parts of the background can be located closer to the camera than the foreground features. In this example, parts of the path along which the hiker 408 walks during a time span of the video clip 103 are closer to the camera, but are background features relative to which the hiker 408 moves.

At operation 306, a reference image 412 (see FIG. 4A) is selected from the video clip 103. In this example embodiment, the reference image 412 is selected by the user, and is provided by a selected one of the video frames 404. This operation may comprise prompting the user to select one of the video frames 404, and may also include provision of a navigation interface on a user device, to enable the user to page or scan through the video frames 404. Selection of the reference image 412 may in such case comprise, e.g., left clicking by the user on a user-preferred frame 404.

At operation 309, the image data of the video clip 103 (in this example digital video data) is processed to automatically segment the foreground and the background of the subject scene which is captured in the video clip 103. In some embodiments, the operation of segmenting of the foreground and the background may include receiving foreground feature identification input or assistance from the user, for example by allowing the user to paint a target foreground feature on a user interface of the image processing application. In this example embodiment, however, foreground and background segmentation is fully automatic, being performed without any user input. An output of the segmentation operation, at operation 309, includes a motion segmentation mask 416 that defines a foreground portion 420 of the image provided by the relevant frame 404, and including the relevant foreground features. In this example, the motion segmentation mask 416 thus contiguously covers the hiker 408 which is to be the focus feature of the simulated tracking shot 117. The remainder of image frame 404 (the inverse of the foreground portion 420 provided by the motion segmentation mask 416) forms a background portion 424 of the frame 404, and encompasses various background features of the scene captured in the video clip 103.

Various methods for automated motion segmentation of dynamic scenes captured on video are known. In this context, dynamic scenes consist of multiple moving objects with a static or moving camera. The objective of motion segmentation is in these instances to segment feature trajectories according to respective motion in the scene. Existing motion segmentation techniques can be divided roughly into feature-based or dense-based methods. In feature-based methods, objects or features are represented by a limited number of points (e.g., corners or salient points), while dense methods compute a pixel-wise motion (see, for example, Kumar et al., "*Learning layered motion segmentations of video*", International Journal of Computer Vision, vol. 76, 2008). In this example embodiment, the automated segmentation, at operation 309, is a dense method, comprising computing optical flow between neighboring frames 404 of the video clip 103, and extracting the motion segmentation mask 416 based on the optical flow information thus produced.

At operation 312, 3-D reconstruction of the scene is performed, thus reconstructing a virtual 3-D space (indicated schematically by reference numeral 427 in FIGS. 4A and 4B) by estimating or determining 3-D coordinates of various features and/or portions of the subject scene represented in the video clip 103. The 3-D reconstruction, at operation 312, recovers 3-D camera motion and a sparse set of 3-D static scene points, or background points 435 (see FIG. 4B), using a structure-from-motion (SFM) process. In this context, "sparse" means that the density of 3-D points is lower than the pixel density of the primitive image provided by the relevant frame 404. SFM is a well-known technique for deriving 3-D information from dynamic video footage, and commercial 3-D camera trackers like Boujou™ and Syntheyes™ are commonly used. In this example embodiment, the Voodoo™ camera tracker application is used for 3-D reconstruction.

At operation 315, information from the motion segmentation operation (at operation 309) and the 3-D space reconstruction (at operation 312) are used in combination to determine a foreground trajectory 429 (FIG. 4A) that reflects movement of the foreground feature (in this example the hiker 408) in the reconstructed 3-D space 427. It will be appreciated that, because of the foreground move steering the time span of the video clip 103, SFM processes that deal with a static scene will typically be insufficient to recover the foreground trajectory 429. Nonrigid structure-from-motion (NRSFM) methods can, however, be used to reconstruct nonrigid scenes from a monocular video. Existing NRSFM methods include recovery of the nonrigid structure from motion factorization (see, for example, Dai et al., "*A simple prior-free method for nonrigid structure from motion factorization*", in CVPR, 2012) or by constrained linear solutions (see, for example, Zhang et al., "*Motion imitation with a handheld camera*", IEEE Transactions on Visualization and Computer Graphics, vol. 17, 2011, or Park et al., "*3d reconstruction of a moving point from a series of 2d projections*", in ECCV, 2010). Any of these processes may be used for the purposes of operation 315.

The NRSFM process used in this example embodiment for foreground motion recovery will now be described. For a static scene point, 3-D reconstruction can be calculated based on rays connecting each frame location to its corresponding camera center intersect at the true 3-D location of the point. The process is known as triangulation. The triangulation constraint does not, however, apply when the point moves in the duration between frames. In these cases NRSFM reconstruction may be employed.

Figure 4B:
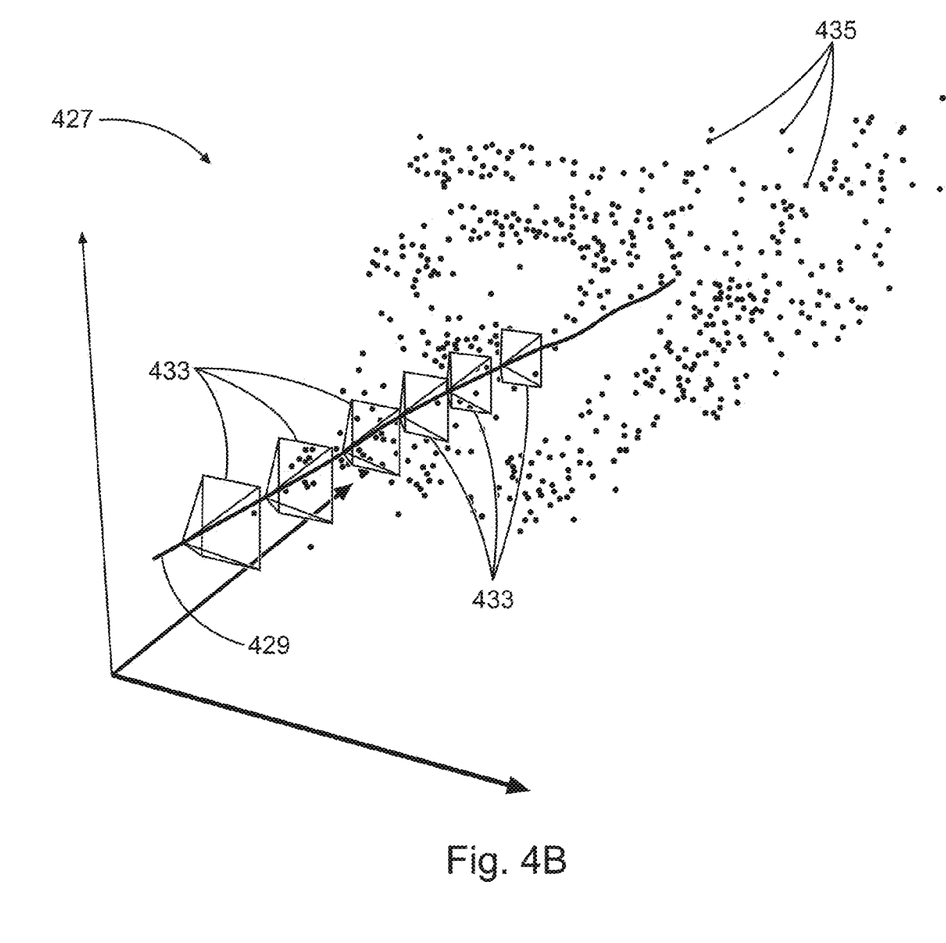
FIG. 4B is a schematic diagram of a reconstructed 3-D space representative of a scene captured in the example image sequence of FIG. 4A, the reconstructed 3-D space including a set of virtual cameras for generating spatially varying blur kernels in accordance with an example embodiment.
Figure 5:
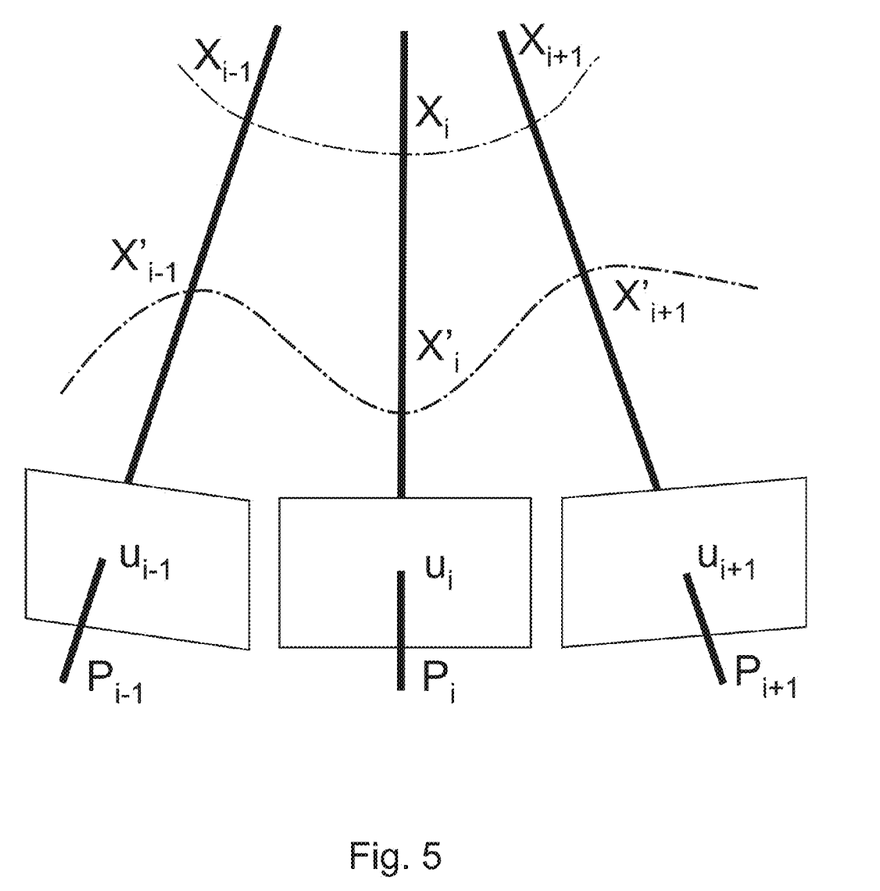
FIG. 5 is a schematic diagram illustrating that dynamic points in 2-D can be mapped to multiple trajectories in 3-D.

FIG. 5 shows an example, where the captured 2D point $u_i$ can correspond to multiple 3D points $X_i$ or $X_i'$. Each of the 2-D points gives a constraint $$u_i = P_i X_i$$

where $P_i$ is the corresponding projection ray of the point on to the image plane. In order to make the solution well constrained, several temporal constraints proposed in Zhang, et al., are adopted, as follows:

$$E = \Sigma_i (P_i X_i - u_i)^2 + \alpha \Sigma_i (X_i - X_{i-1})^2 + \beta \Sigma_i (2x_i - x_{i-1} - X_{i+1})^2 \quad (1)$$

where the first-term minimizes the fitting error. Coefficients α and β are customizable. The second and third terms provide regularization of the unknowns, which minimize the first and second derivatives respectively. The regularization is reasonable, since the moving object in general does not change abruptly in consecutive frames. Equation 1 is a quadratic energy function and has a closed form solution. This method provides the foreground trajectory 429 illustrated schematically in FIGS. 4A and 4B.

At operation 318, the reconstructed 3-D space 427 and the motion segmentation mask 416 remove the foreground information from the reconstructed 3-D space 427, leaving multiple background points 435 that together provide a sparse set of 3-D coordinates for respective points forming part of the background portion 424.

At operation 321, spatially varying blur parameters are derived based on the image data, in this example comprising generating spatially varying blur kernels. This comprises, at operation 324, positioning a plurality of virtual cameras 433 (see FIG. 4B) along the dynamic foreground trajectory 429 in the reconstructed 3-D space 427, and then, at operation 327, projecting the set of sparse 3-D background points 435 on to the virtual cameras 433. Each 3-D background point 435 thus produces a corresponding 2-D projection point on each of the virtual cameras 433. Thereafter, at operation 330, a respective blur kernel 606 (see, e.g., FIG. 6) is determined or synthesized for each background point based on combining or collating the corresponding set of 2-D projection points on the virtual cameras 433. The derived blur parameters thus comprise, in this example embodiment, a sparse set of spatially varying blur kernels 606. Some aspects of operation 321 will now be described in greater depth.

To imitate a tracking procedure with respect to the foreground feature (e.g., the hiker 408) the virtual cameras 433 are, in operation 324, centered on the foreground trajectory 429. The series of virtual cameras 433 thus simulates a time-sequenced, moving image plane in which a projection of the foreground feature (e.g., hiker 408) remains constantly centered in the image frame. The virtual cameras 433 have a fixed, common rotation within the reconstructed 3-D space 427, so that the series of virtual cameras 433 simulates only translation, but not rotation, of a camera through the 3-D space 427.

As is well-established in the art, a virtual camera may be modeled mathematically by an intrinsic matrix $K_v$, a rotation matrix $R_v$ and a camera center $C_v$. A projection matrix $P_v$ can then be composed as $P_v = K_v [R_v | -C_v]$. For further details in this regard, see Hartley, et al., "*Multiple View Geometry in Computer Vision*", vol. 2, Cambridge Univ Press, 2000. From the 3D reconstruction (at operation 312), 3-D camera motion is obtained for each of a number of the video frames 404 of the video clip 103. The 3-D camera motion also consists, for each relevant frame 404, of intrinsics $K_r$, rotations $R_r$, and camera centers $C_r$. In some embodiments, a virtual camera 433 can be provided for each image in the primitive image sequence. In this example, however, a subset 403 of video frames 404, spaced at regular intervals, is selected from the video clip 103. The series of virtual cameras 433 thus consists, in this example, of 10-15 video frames 404, even though the video clip 103 can comprise hundreds of frames 404.

The intrinsic is borrowed for the virtual cameras 433, $K_v = K_r$, and, as mentioned, virtual camera rotations are set to a fixed rotation corresponding to the reference image 412 at time t as $R_v = R^t_r$. The camera centers $C_v$ are set to respective positions on the dynamic foreground trajectory 429. In this example embodiment, several position on the foreground trajectory 429 are equally sampled around time t (e.g. consisting of five positions before time t, and five positions after time t).

Figure 6:
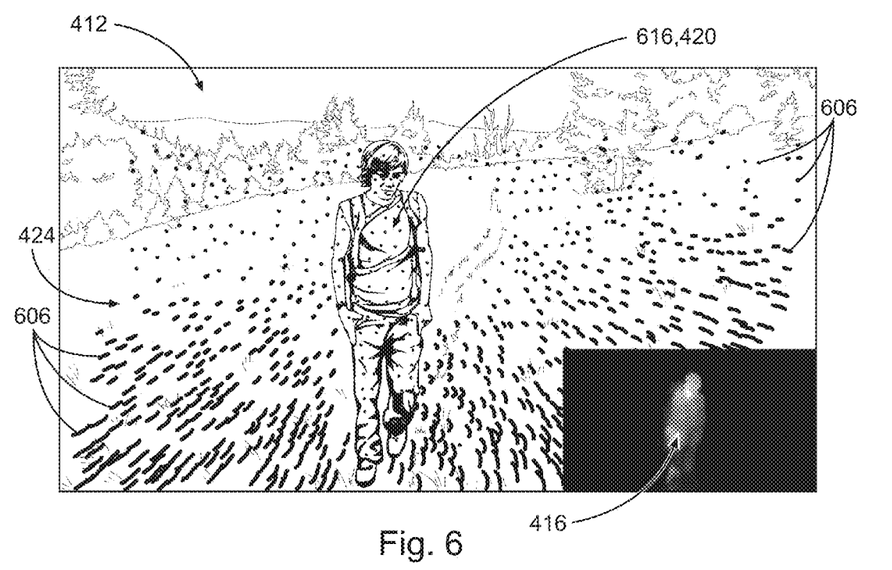
FIG. 6 is a schematic representation of an example sparse blur kernel map derived from the example reconstructed 3-D space of FIG. 4B, and overlaid on an example reference image selected from the example image sequence of FIG. 4A.

As mentioned briefly above, the blur kernels 606 are generated by projecting the three-dimensional background points 435 on to the virtual cameras 433. The projection of one 3-D point onto one virtual camera 433 gives a single 2-D projection point. Projection of one 3-D point on to the series of virtual cameras 433 thus gives a set of 2-D positions from which, in this example, is taken one blur kernel 606 corresponding to the 3-D background point from which it was projected. In other embodiments, some processing of the set of 2-D projection points may be performed to synthesize a blur kernel, for example by connecting the 2-D projection points in instances where there are discontinuities in the set of 2-D projection points. FIG. 6 shows an example of a set of sparse spatially varying blur kernels 606 generated for the reference image 412 from the video clip 103. Because the blur kernels 606 are generated directly by projection of 3-D background points 435, the blur kernels 606 are physically correct. A depth of respective point on the background portion 424 of the reference image 412 can, for example, readily be observed from the length of the corresponding blur kernel 606.

At operation 333 (FIG. 3), a set of dotted blur kernels 616 (FIG. 6) coincident with the foreground portion 420 is added to the spatially varying blur kernels 606 of the background portion 424. This prevents blurring of the foreground portion 420 during the blurring process, leaving the foreground portion 420 substantially unblurred, as is characteristic of a well-executed tracking shot. The set of dotted blur kernels 616 is added on the foreground portion 420 based on the segmentation mask 416 obtained in motion segmentation operation 309.

At operation 336, the respective blur kernel 606 is calculated for each image pixel in the reference image 412, to provide a set of blur kernels 606 for the reference image 412 at per-pixel density. In this example embodiment, a simple interpolation method based on relative distances is used for the interpolation process. In other embodiments, more advanced edge-aware interpolation techniques can be used.

Figure 7:
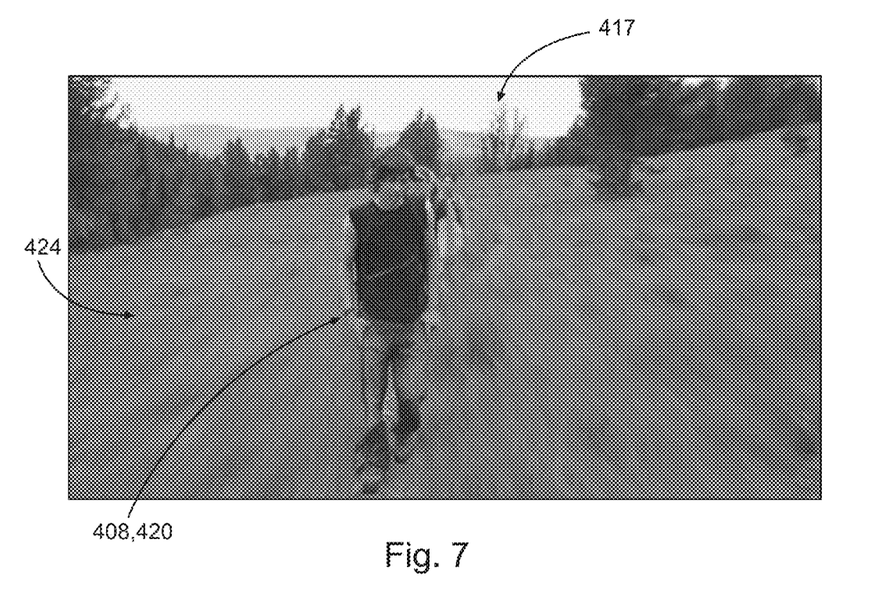
FIG. 7 is an example embodiment of a simulated tracking shot generated from the image sequence of FIG. 4A, in accordance with one example embodiment.

Finally, at operation 339, the reference image 412 and the per-pixel dense blur kernels 606 of them convoluted to generate the simulated tracking shot 417, an example of which is shown in FIG. 7. As can be seen, the hiker 408 (which provides the foreground feature in this example) in the simulated tracking shot 417 is substantially unblurred from the reference image 412, while the background is blurred in a manner that simulates motion blur caused by relative movement between the camera and the respective background features with a slow shutter speed. In some embodiments, the image processing application may be configured to present the user with blur modification options to adjust the amount of blur applied to the background. The user may, for example, adjust a blur parameter according to which the spatially varying blur kernels 606 may be scaled up or down, as the case may be.

The simulated tracking shot 417 generated by the method described with reference to FIG. 3, which includes 3-D reconstruction, can be considered as a physically-correct shot, because it is a simulation of real capture procedure. In other embodiments, a less rigorous technique may be used for estimating depths of respective background points 435. This less rigorous technique is referred to herein as a 2.5-D method, an example of which is described in what follows.

A 3-D reconstruction delivers 3-D coordinates for respective background features and/or scene points, and thus provides absolute depth values. A correct depth-aware tracking shot can, however, be synthesized based on relative depth information between features in the image scene. To this end, relative depth is extracted from feature tracks of a few frames 404.

Figure 8:
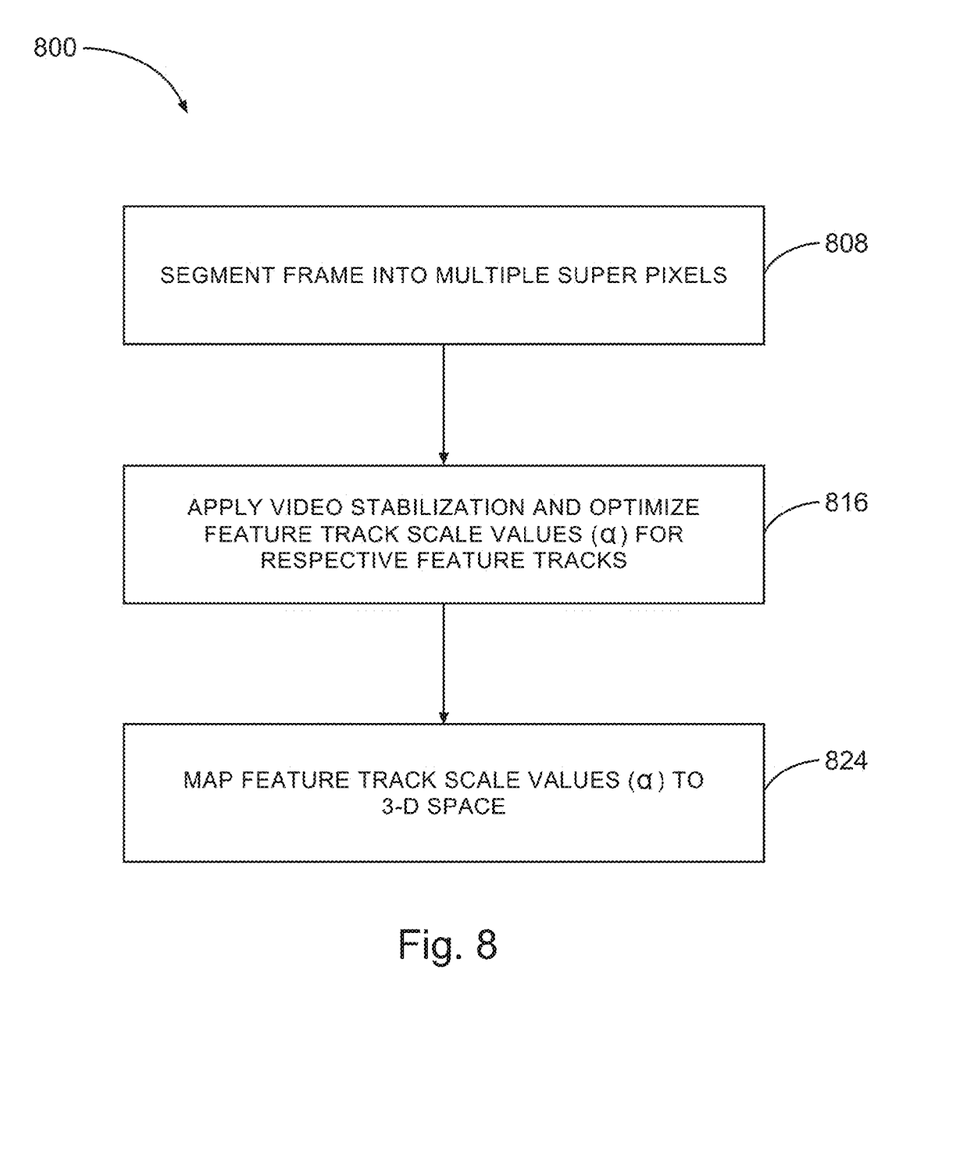
FIG. 8 is a diagrammatic flowchart of a method for estimating depths values for respective background points in an image sequence, in accordance with an example embodiment.

Consider one feature track, by which is meant a track followed by a particular feature in the scene over the course of the considered frames 404. An average coordinate difference of a single feature track is denoted $P_i$. If there is no camera rotation, the features that are closer to the camera should have larger values for $P_i$. A comparison of respective feature track information may thus be used to estimate relative depths of different parts or features of the scene. FIG. 8 shows an example embodiment of a method 800 to estimate background depth information, to enable tracking shot simulation based in a 2.5-D process. Broadly, the method 800 comprises tracking movement over the time span of the image sequence (e.g., the video clip 103) of multiple background features forming part of the background portion, to determine respective feature tracks for the multiple background features. Relative depth information for multiple background points in the background portion 424 is then estimated based on the respective identified-feature tracks.

As will be described below, the depth estimation comprises an optimization procedure for each feature track with reference to neighboring feature tracks. Relying on spatial distance between feature tracks to identify neighbor features can, however, be problematic in certain instances, as there could exist depth discontinuity where two points are spatially close in the image, but are far away from each other in depth. To account for such discontinuities, over segmentation is applied, at operation 808, to segment the frame 404 into multiple super pixels, as proposed by Felzenszwalb, et al., in "Efficient graph-based image segmentation", *International Journal of Computer Vision*, vol. 59.

Video stabilization is applied before computing the average coordinate difference ($P_i$) for a feature track. In this embodiment, the video stabilization as applied to remove camera rotation, so that feature track scale differences are due only to camera translation. In other embodiments, (e.g., where camera motion during video capture is a panning operation in which the camera swivels to follow a foreground feature moving substantially across the image plane) video stabilization may comprise removing translation, rather than removing rotation. For each feature track, a scale value $\alpha_i$ is assigned by solving the following energy equation (Equation 2):

$$E = \min_{\alpha} \sum_i \left( \| \alpha_i \bar{P} - [S(P]_i] \| + \sum_{j \in N_i} \| \alpha_i - \alpha_j \| \right)$$

wherein
 $P_i$ is the average coordinate difference of track i,
 $\bar{P}$ is the average of all $P_i$
 S(.) is a video stabilization operator, and
 $N_i$ refers to the neighboring tracks of i.

Optimization based on the above equation, to provide respective scale values for the feature tracks, is based on the insight that neighboring tracks (j) of track (i) should have similar scale values ($\alpha$). To account for depth discontinuities, spatial distances are computed only for features within the same super pixel. Equation 2 is quadratic and can thus be solved by a least-square regression procedure.

At operation 816, video stabilization and optimization of feature track scale values for the respective features are performed according to Equation 2. This provides a scale value $\alpha$ for each feature identified for tracking. At operation 824, the scale values are mapped to the 3-D space by an exponential function, to provide a depth value for each of the features. In this embodiment, $2^{\alpha_i}$ is applied empirically.

In this manner, background depths for multiple points in the background portion 424 are provided, without performing rigorous 3-D reconstruction of the image scene. These estimated background depths can be used for projection on to a plurality of virtual cameras 433, to derive blur kernels for simulated tracking shot generation.

Another embodiment of a method for generating a simulated tracking shot from video footage or an image sequence is thus similar to the method 300 described with reference to FIG. 3, with the exception that the operations of reconstructing the 3-D space (at operation 312) and determining 3-D background depths (at operation 318) are instead replaced by depth parameter estimation consistent with or analogous to the method 800 described with reference to FIG. 8.

Figure 9:
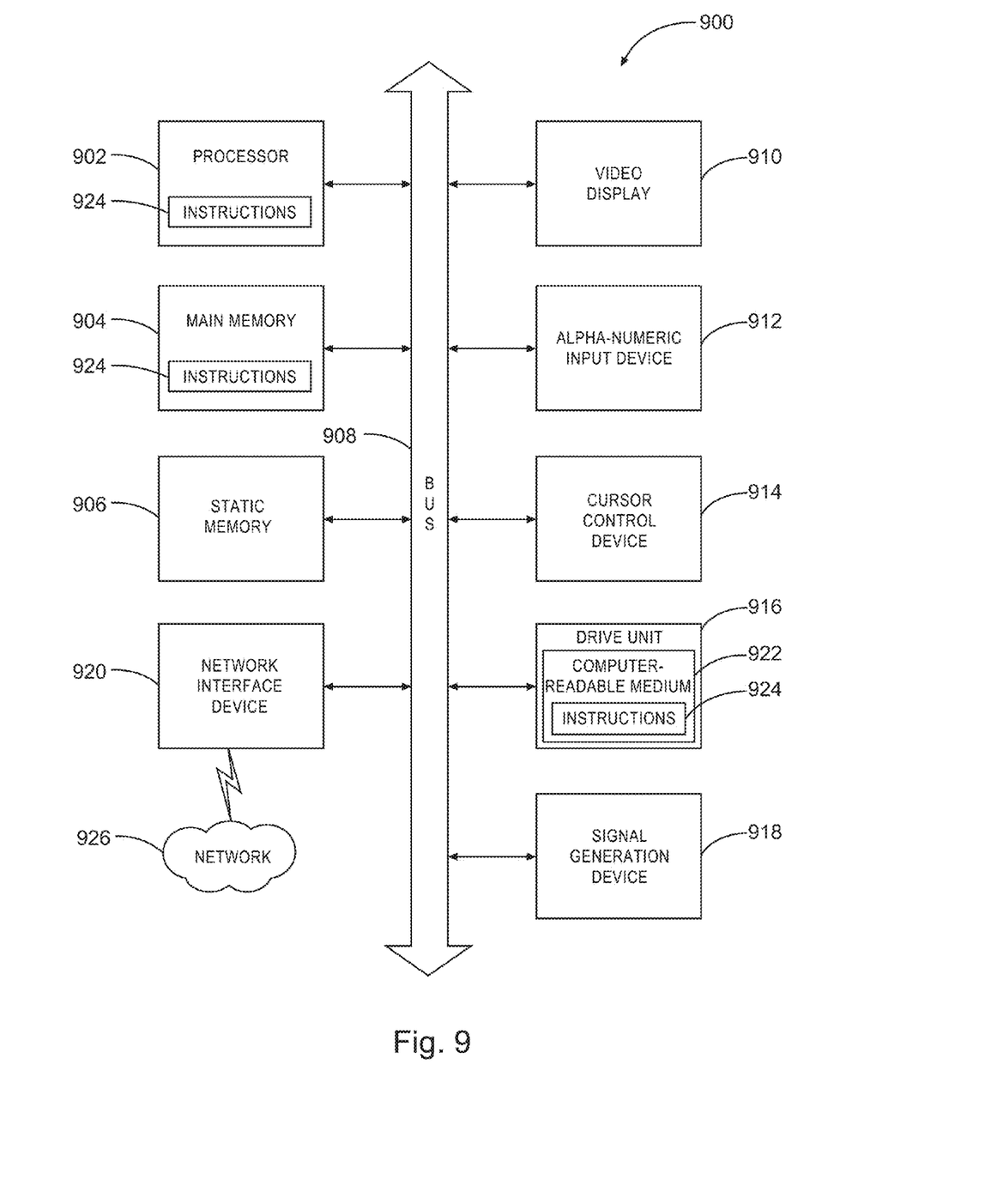
FIG. 9 is a block diagram illustrating components of a machine, according to some example embodiments, configured to read instructions from a machine-readable medium and perform any one or more of the methodologies described herein.

FIG. 9 is a block diagram illustrating components of a machine 900, according to some example embodiments, able to read instructions from a machine-readable medium (e.g., a machine-readable storage medium) and perform any one or more of the methodologies discussed herein, in whole or in part. Specifically, FIG. 9 shows a diagrammatic representation of the machine 900 in the example form of a computer system and within which instructions 924 (e.g., software, a program, an application, an applet, an app, or other executable code) for causing the machine 900 to perform any one or more of the methodologies discussed herein may be executed. In alternative embodiments, the machine 900 operates as a stand-alone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The machine 900 may further include a video display 910 (e.g., a plasma display panel (PDP), a light emitting diode (LED) display, a liquid crystal display (LCD), a projector, or a cathode ray tube (CRT)). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 (also referred to as "computer-readable medium") on which is stored the instructions 924 embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 (or computer-readable medium) is shown in an example embodiment to be a single medium, the terms "machine-readable medium" and "computer-readable medium" should be taken to include a single medium or multiple media (e.g., a centralized or distributed database, or associated caches and servers) able to store instructions 924. The terms "machine-readable medium" and "computer-readable medium" shall also be taken to include any medium, or combination of multiple media, that is capable of storing instructions (e.g., instructions 924) for execution by a machine or computer (e.g., machine 900), such that the instructions, when executed by one or more processors of the machine or computer (e.g., processor 902), cause the machine or computer to perform any one or more of the methodologies described herein. Accordingly, a "machine-readable medium" refers to a single storage apparatus or device, as well as "cloud-based" storage systems or storage networks that include multiple storage apparatuses or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some example embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Of course, the functions described herein for any single machine, database, or device may be subdivided among multiple machines, databases, or devices. As used herein, a "database" is a data storage resource and may store data structured as a text file, a table, a spreadsheet, a relational database (e.g., an object-relational database), a triple store, a hierarchical data store, or any suitable combination thereof.

What is claimed is:

1. A method, comprising:
   accessing image data for an image sequence of a subject scene, the image sequence comprising a plurality of images captured at different respective times, the image sequence capturing relative movement in the subject scene between a foreground feature and a background during a time span of the image sequence;
   selecting from the image sequence a reference image that comprises a foreground portion and a background portion, the foreground portion capturing the foreground feature;
   in an automated operation using one or more processors, deriving from the image data spatially varying blur parameters for at least part of the background portion, wherein the spatially varying blur parameters include a plurality of blur kernels; and
   generating a modified image by blurring the background portion of the reference image based on the spatially varying blur parameters, to simulate the relative movement of the background during the image sequence time span, the modified image having a substantially unblurred foreground portion relative to the reference image.

2. The method of claim 1, wherein the plurality of blur kernels include a plurality of per-pixel blur kernels, wherein deriving spatially varying blur parameters further comprises generating the per-pixel blur kernels for the reference image, and wherein the generating of the modified image comprises convolving the reference image and the per-pixel blur kernels.

3. The method of claim 2, wherein the generating of the per-pixel blur kernels for the reference image comprises associating dotted blur kernels with respective image pixels in the foreground feature.

4. The method of claim 1, wherein the deriving of the spatially varying blur parameters comprises:

positioning a plurality of virtual cameras at respective positions in a reconstructed three-dimensional space of the subject scene;

projecting multiple background points in the reconstructed three-dimensional space on to the plurality of virtual cameras, to derive a two-dimensional projection point on each of the plurality of virtual cameras for each of the multiple background points, so that each of the multiple background points provides a corresponding set of projection points on the plurality of virtual cameras; and deriving a separate blur kernel, of the plurality of blur kernels, for each of the multiple background points based on the corresponding set of projection points on the plurality of virtual cameras, to generate a set of spatially varying blur kernels.

5. The method of claim 4, wherein the multiple background points together form a sparse subset of image pixels in the background portion, the method further comprising, based on the set of spatially varying blur kernels, calculating a respective background blur kernel for each background portion image pixel that is not represented in the multiple background points, to provide multiple background blur kernels for the background portion at per-pixel density.

6. The method of claim 4, wherein the deriving of the spatially varying blur parameters further comprises determining a foreground trajectory that reflects movement of the foreground feature in the reconstructed three-dimensional space, and wherein the plurality of virtual cameras are positioned at different trajectory points along the foreground trajectory.

7. The method of claim 6, wherein the plurality of virtual cameras have a fixed, common orientation in the reconstructed three-dimensional space, so that there is no rotation from one virtual camera to another.

8. The method of claim 1, further comprising automatically segmenting the foreground portion and the background portion.

9. The method of claim 8, wherein the segmenting of the foreground portion and the background portion comprises:
determining optical flow information that indicates optical flow between each pair of neighboring images in the image sequence; and
extracting the foreground portion based on the optical flow information.

10. The method of claim 1, wherein the deriving of the spatially varying blur parameters comprises reconstructing a three-dimensional space of the subject scene.

11. The method of claim 10, wherein the reconstructing of the three dimensional space comprises:
tracking movement over the time span of the image sequence of multiple background features forming part of the background portion, to determine respective feature tracks for the multiple background features; and
estimating relative depth information for the multiple background points in the background portion based on the respective feature tracks.

12. The method of claim 11, further comprising performing video stabilization of the image sequence for tracking the movement of the multiple background features.

13. The method of claim 12, wherein the performing of the video stabilization comprises substantially removing camera rotation for the image sequence.

14. A system, comprising:
one or more processors; and
memory, coupled with the one or more processors, having instructions stored thereon which, when executed by the one or more processors, implement:

an image data module that is configured to access image data for an image sequence of a subject scene, the image sequence comprising a plurality of images captured at different respective times, the image sequence capturing relative movement in the subject scene between a foreground feature and a background during a time span of the image sequence;

a reference image data module configured to select from the image sequence a reference image that comprises a foreground portion and a background portion, the foreground portion capturing the foreground feature;

a blur derivation module configured to derive spatially varying blur parameters for at least part of the background portion from the image data in a substantially automated operation using one or more processors, wherein the spatially varying blur parameters include a plurality of blur kernels; and a simulation generator module configured to generate a modified image by blurring the background portion of the reference image based on the spatially varying blur parameters, to simulate the relative movement of the background during the image sequence time span, the modified image having a substantially unblurred foreground portion relative to the reference image.

15. The system of claim 14, wherein the blur derivation module is configured to derive a set of spatially varying blur kernels by deriving a separate respective blur kernel for each one of multiple background points in the background portion of the reference image, and wherein the simulation generator module is configured to convolve the reference image and the set of spatially varying blur kernels.

16. The system of claim 14, further comprising:
a virtual camera module configured to position a plurality of virtual cameras at respective positions in a reconstructed three-dimensional space of the subject scene;
a background projection module configured to project multiple background points in the reconstructed three-dimensional space on to the plurality of virtual cameras, to derive a two-dimensional projection point on each of the plurality of virtual cameras for each of the multiple background points, so that each of the multiple background points provides a corresponding set of projection points on the plurality of virtual cameras; and
a blur kernel module configured to derive a separate blur kernel for each of the multiple background points based on the corresponding set of projection points on the plurality of virtual cameras, thereby to generate a set of spatially varying blur kernels.

17. The system of claim 16, further comprising a motion analysis module configured to determine from the image data a foreground trajectory that reflects movement of the foreground feature in the reconstructed three dimensional space, wherein the plurality of virtual cameras are positioned at different trajectory points along the foreground trajectory.

18. The system of claim 14, further comprising a segmentation module configured for processing the image data to automatically identify and segment the foreground portion and the background portion.

19. The system of claim 14, further comprising a motion analysis module configured for processing the image data to reconstruct a three-dimensional space of the subject scene.

20. A non-transitory computer-readable storage medium including instructions, when executed by a computer, cause the computer to perform operations comprising:
accessing image data for an image sequence of a subject scene, the image sequence comprising a plurality of images captured at different respective times, the image sequence capturing relative movement in the subject scene between a foreground feature and a background during a time span of the image sequence;

selecting from the image sequence a reference image that comprises a foreground portion and a background portion, the foreground portion capturing the foreground feature;

in an automated operation using one or more processors, deriving spatially varying blur parameters for at least part of the background portion from the image data, wherein the spatially varying blur parameters include a plurality of blur kernels; and generating a modified image by blurring the background portion of the reference image based on the spatially varying blur parameters, to simulate the relative movement of the background during the image sequence time span, the modified image having a substantially unblurred foreground portion relative to the reference image.

* * * * *